United States Patent
Rose et al.

(10) Patent No.: US 12,393,905 B2
(45) Date of Patent: *Aug. 19, 2025

(54) INTELLIGENT LABORATORY LOCKBOX SYSTEM

(71) Applicant: CERNER INNOVATION, INC., Kansas City, MO (US)

(72) Inventors: Joseph Rose, Grand Blanc, MI (US); John Easler, Green Cove Springs, FL (US); James Williams, Matthews, NC (US); Jeff Raines, Harrisburg, NC (US); Nghia Tran, Kansas City, MO (US); Dustin Scholz, Kansas City, MO (US); John Christopher Penrod, Kansas City, MO (US)

(73) Assignee: CERNER INNOVATION, INC., Kansas City, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,990

(22) Filed: Dec. 7, 2023

(65) Prior Publication Data

US 2024/0164463 A1    May 23, 2024

Related U.S. Application Data

(63) Continuation of application No. 16/896,923, filed on Jun. 9, 2020, now Pat. No. 11,857,017.

(Continued)

(51) Int. Cl.
*G06Q 10/0832* (2023.01)
*G06Q 10/0833* (2023.01)

(52) U.S. Cl.
CPC ..... *G06Q 10/0832* (2013.01); *G06Q 10/0833* (2013.01)

(58) Field of Classification Search
CPC .......... G06Q 10/0633; G06Q 10/0832; G06Q 10/0833

(Continued)

(56) References Cited

U.S. PATENT DOCUMENTS

2017/0122656 A1* 5/2017 Nott ..................... F25D 29/008
2017/0337337 A1* 11/2017 Heckerman ............ G16H 40/20

(Continued)

FOREIGN PATENT DOCUMENTS

WO    WO-2014176289 A2 * 10/2014    ............. B65D 81/18

OTHER PUBLICATIONS

V. J. Anselmo, R. G. Harrison and A. P. Rinfret, "Programmable Temperature Control System for Biological Materials," Aug. 1982, IEEE Transactions on Biomedical Engineering, vol. BME-29, No. 8, pp. 557-568. (Year: 1982).*

*Primary Examiner* — Jeff Zimmerman
*Assistant Examiner* — Hunter Molnar
(74) *Attorney, Agent, or Firm* — Kraguljac Law Group LLC

(57) ABSTRACT

Systems and methods provide for an intelligent laboratory lockbox. The intelligent laboratory lockbox includes a vault unit and one or more presence sensors configured to detect a presence of a specimen within the one or more compartments of the vault unit. The presence sensor(s) may generate a load status based on sensing a specimen in the vault unit, wherein the load status includes one of a loaded status or an unloaded status. A control unit is operably connected to at least the vault unit and the one or more presence sensors. The control unit is configured to modify a specimen pickup workflow based on the load status.

18 Claims, 18 Drawing Sheets

Related U.S. Application Data

(60) Provisional application No. 62/859,989, filed on Jun. 11, 2019.

(58) Field of Classification Search
USPC .......................................................... 705/332
See application file for complete search history.

(56) References Cited

U.S. PATENT DOCUMENTS

| | | | |
|---|---|---|---|
| 2018/0202908 A1* | 7/2018 | Croquette | ............ A01N 1/0257 |
| 2018/0365643 A1* | 12/2018 | Zhu | ................. G06K 19/06037 |
| 2019/0390921 A1* | 12/2019 | Kamura | ................ F28D 20/028 |
| 2020/0071985 A1* | 3/2020 | Winter | ...................... E05G 1/10 |
| 2020/0298239 A1 | 9/2020 | Pedrazzini et al. | |

* cited by examiner

INTELLIGENT LABORATORY LOCKBOX SYSTEM

CROSS REFERENCE TO RELATED APPLICATIONS

This disclosure is a continuation of U.S. patent application Ser. No. 16/896,923 filed Jun. 9, 2020, titled "INTELLIGENT LABORATORY LOCKBOX SYSTEM", inventors: Joseph ROSE, et al. and assigned to the present assignee. Further, this application claims the benefit of priority to U.S. Provisional Application No. 62/859,989, filed on Jun. 10, 2019, entitled "Intelligent Laboratory Lockbox," the entirety of both are incorporated herein by reference.

BACKGROUND

Laboratories are responsible for the safe handling of a large number of specimens/samples. There are many difficulties faced by laboratory facilities, or any facility charged with the collection, storage, or transport of specimens. For instance, tracking specimens is often times difficult given the current workflows where specimens are simply placed in a specimen lockbox and not tracked while en route to a destination. Put another way, a collecting entity may not have confirmation that a specimen has been picked up or arrived at an intended destination. Further, specimens require storage at certain temperatures but laboratories are often limited on capabilities of a lockbox in which a specimen must be stored for pickup. The lockboxes are, often, simply cooler-type containers that include gel packs to try and maintain a cooler temperature. Thus, maintaining the integrity of a sample is not always possible given the less than ideal storage containers currently utilized.

SUMMARY

Embodiments of the present invention relate to, among other things, an intelligent laboratory lockbox system. The intelligent laboratory lockbox system can comprise a vault unit and a base unit and the system can provide laboratories a secure, rechargeable battery-powered specimen lockbox (i.e., vault unit) that is capable of, among other things, maintaining an appropriate storage temperature of laboratory specimens regardless of external ambient temperatures. The intelligent laboratory lockbox system can also communicate to one or more disparate sources (e.g., a parent laboratory, an electronic health record ("EHR"), etc.) various information associated with the lockbox system including, but not limited to, a load status (comprising a loaded status or an unloaded status), a state of charge, temperature telemetry data, and the like.

The intelligent laboratory lockbox can be self-regulated or controlled by a remote processor. The intelligence of the intelligent laboratory lockbox preserves specimen integrity, protects personal health information, avoids missed specimen pickups, improves positive specimen tracking for laboratories and clients of laboratories, provides cost savings via the elimination of unproductive steps where no specimens are present for pickup, improves client satisfaction, and the like.

In one embodiment, a laboratory lockbox system is described comprising a base unit; a vault unit including one or more compartments to store one or more specimens; a fluid connection between the base unit and the vault unit; at least one temperature sensor configured to measure an internal temperature of the vault unit; a cooling mechanism configured within the base unit and configured to, based on at least the internal temperature received from the at least one temperature sensor, activate cooling functions to self-regulate the internal temperature to a first temperature; one or more presence sensors configured to sense or detect a presence of a specimen within the one or more compartments of the vault unit and generate a load status based on sensing a specimen, wherein the load status includes one of a loaded status or an unloaded status; a control unit operably connected to at least the vault unit and the one or more presence sensors, wherein the control unit is configured to: receive an indication of a change in the load status from the vault unit; determine whether the change in the load status changes a specimen pickup workflow; upon determining that the change in the load status changes the specimen pickup workflow, generate an optimized pickup workflow based on the change in the load status of the vault unit; wherein in response to the load status changing from the unloaded state to the loaded state, the optimized pickup workflow is generated to include a courier route to a location of the vault unit to pickup the specimen; wherein in response to the load status changing from the loaded state to the unloaded state, the optimized pickup workflow is generated to remove the courier route to the location of the vault unit; generate a notification of the optimized pickup workflow at one or more remote computing devices separate from the vault unit; and transmit the notification of the optimized pickup workflow to a destination device.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide an intelligent laboratory lockbox system. The collection, labeling, handling, storage, and transport of laboratory specimens are all integral steps that can individually compromise the integrity of a sample if not properly performed. Maintaining proper storage conditions and properly providing a secured specimen for transport can be addressed with specimen lockboxes described herein.

For some facilities, maintaining proper storage conditions is difficult given that many facilities have specimen lockboxes that must be placed outdoors. Outdoor temperatures can have an impact on the internal temperature of the specimen lockboxes. Many facilities will use a frozen gel pack during summer months to reduce the internal temperature of the specimen lockbox. Additionally, typical lockboxes do not communicate with other sources regarding, for instance, a status of specimens within the lockbox.

Figure 1A:
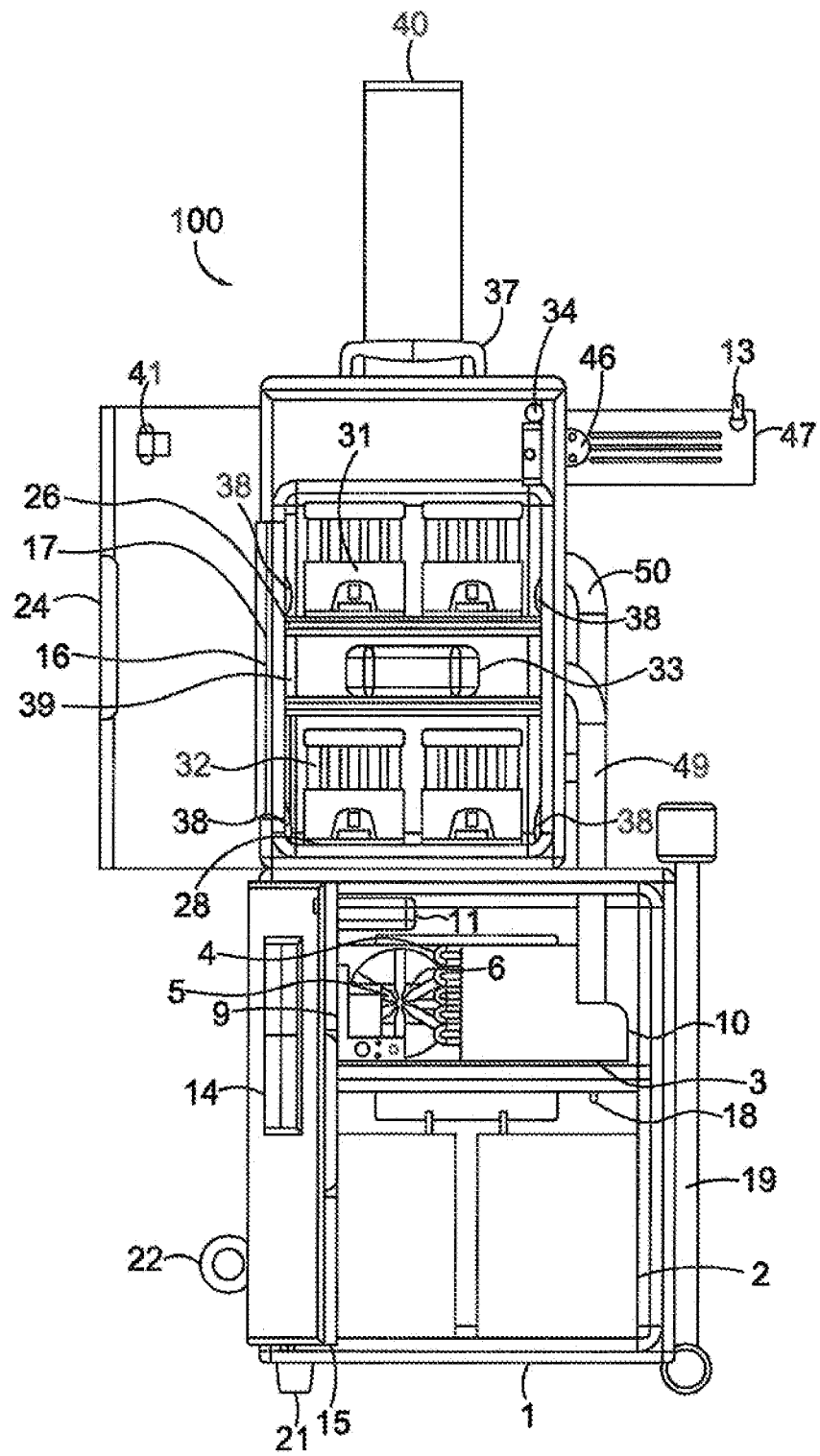
FIG. 1A depicts a front view of an intelligent laboratory lockbox system having one or more doors in an open position, in accordance with some implementations of the present disclosure.
Figure 1B:
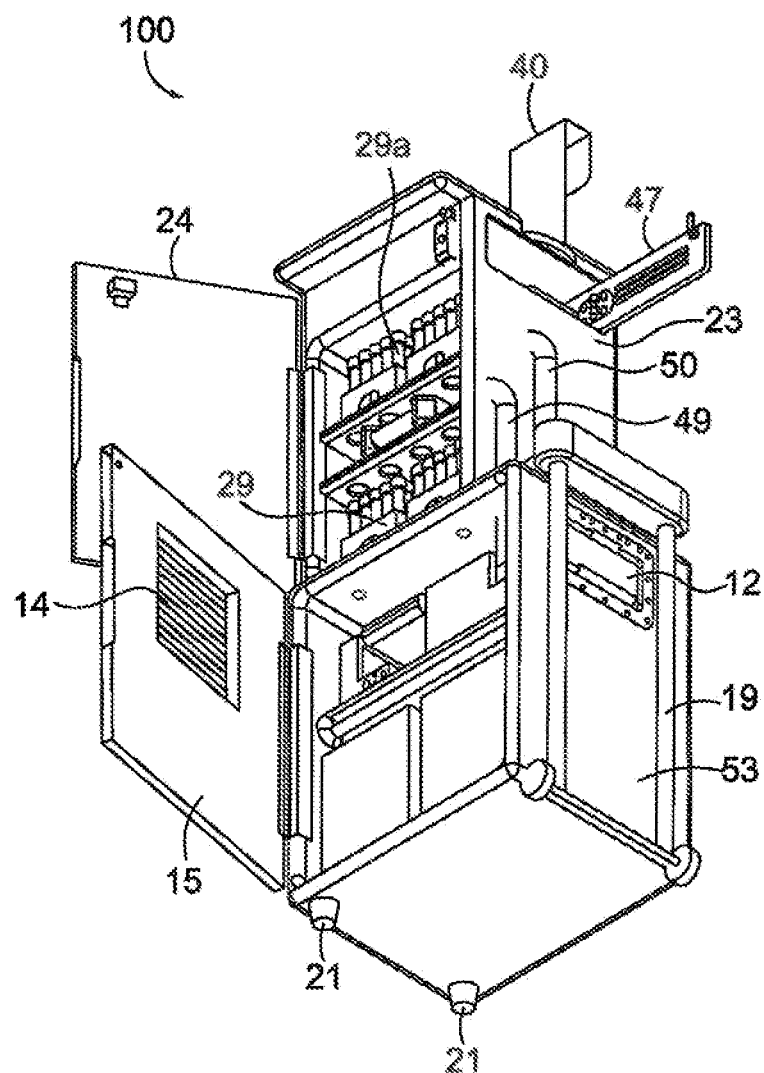
FIG. 1B depicts a bottom perspective view of an intelligent laboratory lockbox system having one or more doors in an open position, in accordance with some implementations of the present disclosure.
Figure 1C:
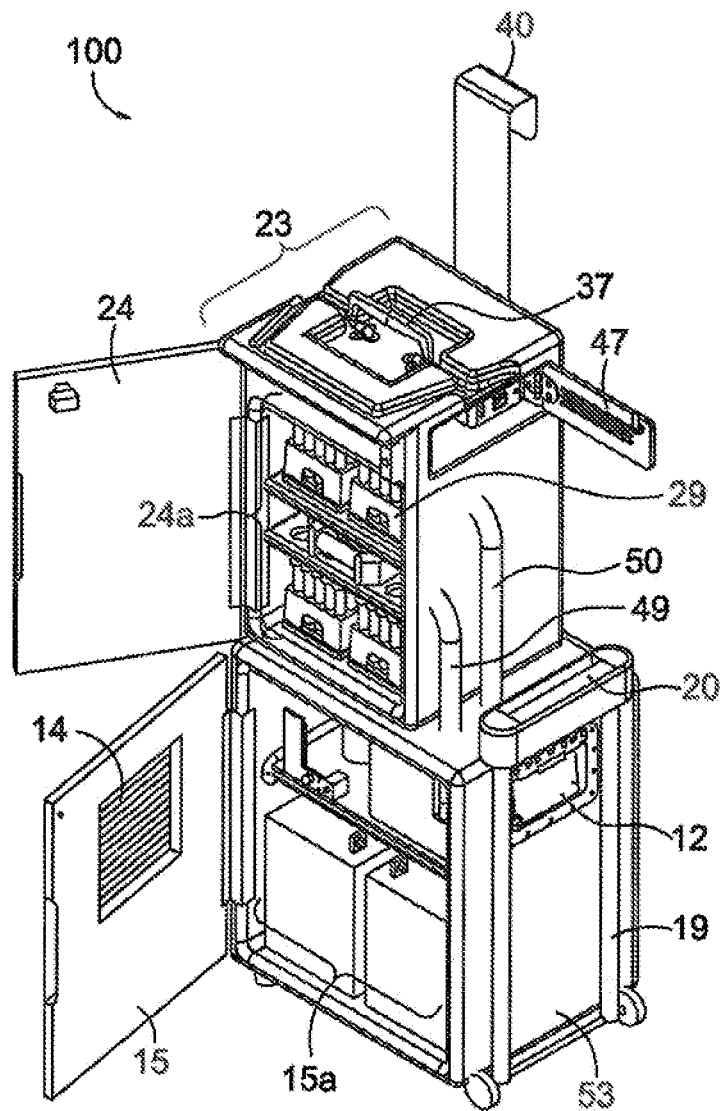
FIG. 1C depicts a right side perspective view of an intelligent laboratory lockbox system having one or more doors in an open position, in accordance with some implementations of the present disclosure.

An exemplary intelligent laboratory lockbox system ("ILLS") 100 is provided in FIGS. 1A-1C. The ILLS can comprise a vault unit 23 and a base unit 53. Generally speaking, the vault unit 23 can include one or more compartments to store one or more specimens while the base unit 53 assists with the self-regulation of an internal temperature of the vault unit 23, regardless of the external temperature. The base unit 53 sits atop a base case 1. The base case 1 is transported utilizing a cart having a cart base 19 and a cart top 20. The cart has one or more wheels with which to move the ILLS 100 or just the base unit 53. The cart is further equipped with one or more pegs 21 for stationary positioning. Further, a tether ring 22 is affixed to the base unit 53 for securing the base unit 53 to an object with, for example, a cable. The base unit 53 further comprises a handle 12. Further shown in FIGS. 1A-1C is a base access door 15 in an open position to access a base interior 15a. The base access door 15 comprises an air vent 14. The base unit 53 can include several components within the base interior 15a to self-regulate a temperature of a vault unit 23 and those specific components are illustrated in FIG. 4C. As is shown in FIG. 4C, the base unit 53 has a base access door 15 in an open position and sits atop a cart base 19 having one or more wheels and one or more pegs 21. The base interior 15a can comprise a cooling mechanism including any combination of components, but is not limited to, one or more cooling unit condensers 4 (shown in FIG. 1A), one or more cooling unit fans 5, one or more cooling unit compressors 6, one or more cooling unit evaporators 8, one or more cooling unit driver boards 9, one or more cooling unit ducts 10, one or more batteries 2, one or more control units (e.g., processors) 11, one or more drain hoses 18, and a cooling unit base 3 supporting one or more of the above-described components. The cooling mechanism is configured to, based on at least the internal temperature of the vault unit received from the at least one temperature sensor, activate cooling functions to self-regulate the internal temperature to a specified temperature.

Figure 3A:
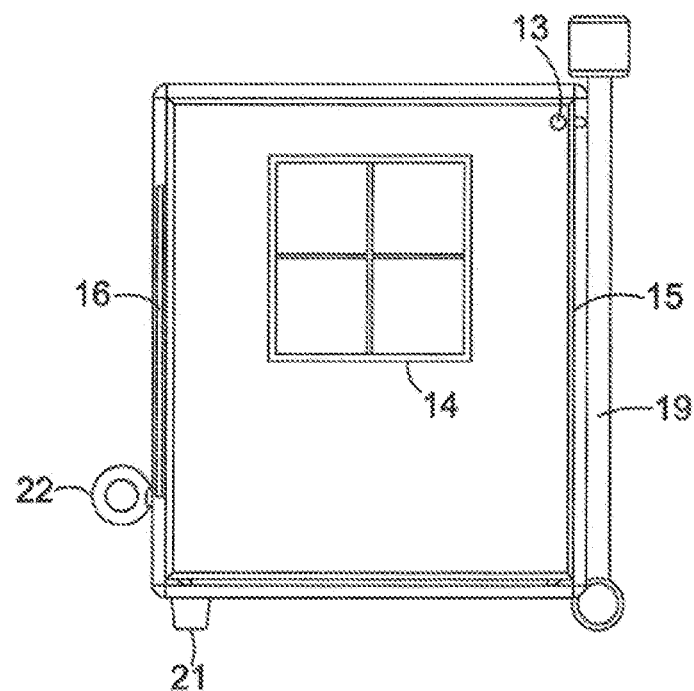
FIG. 3A depicts a front view of a base unit of an intelligent laboratory lockbox system having one or more doors in a closed position, in accordance with some implementations of the present disclosure.
Figure 3B:
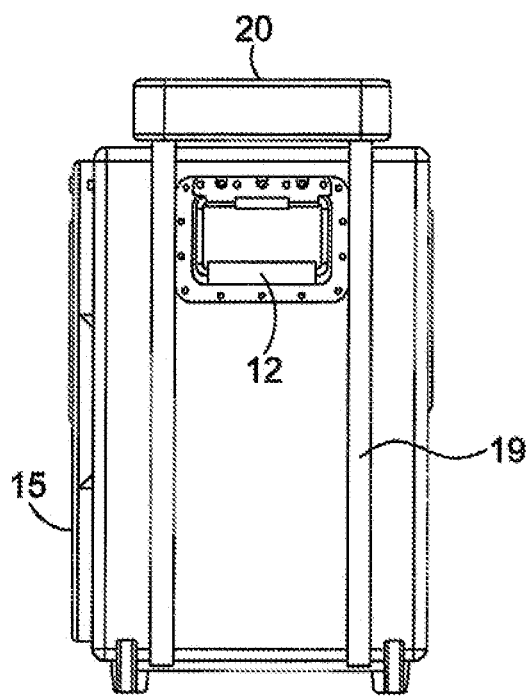
FIG. 3B depicts a right side view of a base unit of an intelligent laboratory lockbox system having one or more doors in a closed position, in accordance with some implementations of the present disclosure.

Various additional views of the base unit 53 are provided in FIGS. 3A and 3B. FIG. 3A provides a front view of the base unit 53 having the base access door 15 in a closed position. As is shown, the base access door 15 is affixed to the base unit 53 via one or more hinges 16. FIG. 3B depicts a right side view of the base unit 53 having the base access door 15 in a closed position. The handle 12 is shown positioned between the two supporting vertical structures of the cart base 19.

Figure 4A:
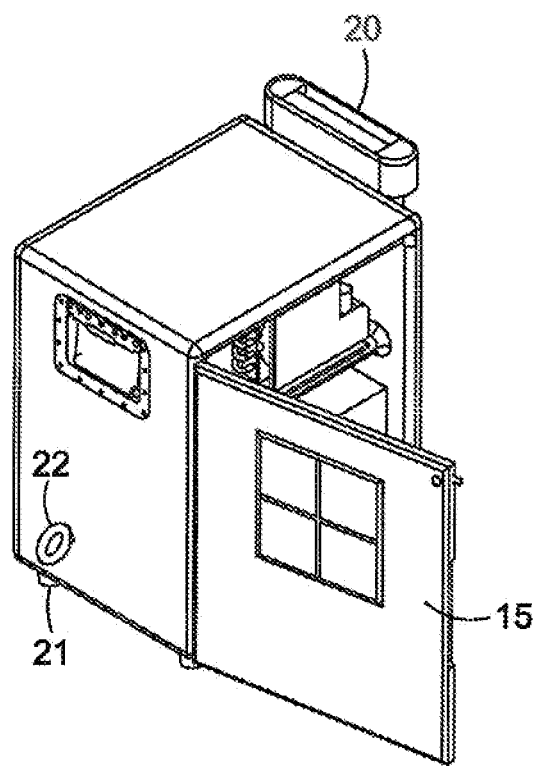
FIG. 4A depicts a left side perspective view of a base unit of an intelligent laboratory lockbox system having one or more doors in an open position, in accordance with some implementations of the present disclosure.
Figure 4B:
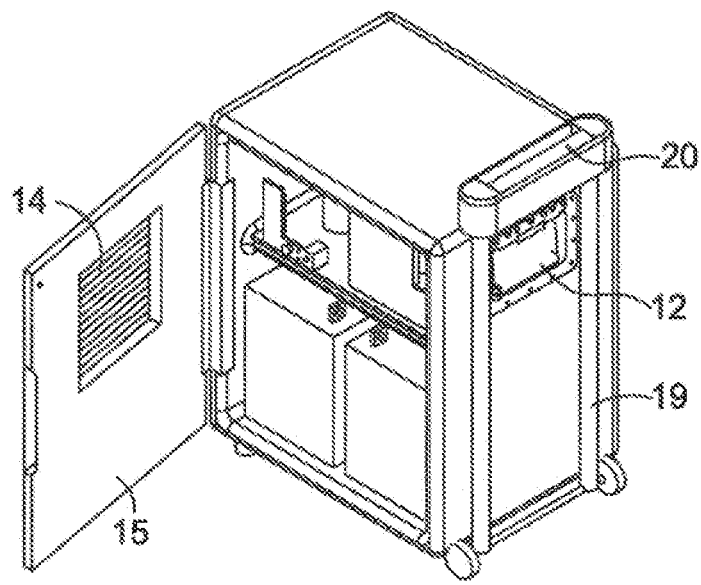
FIG. 4B depicts a right side perspective view of a base unit of an intelligent laboratory lockbox system having one or more doors in an open position, in accordance with some implementations of the present disclosure.
Figure 4C:
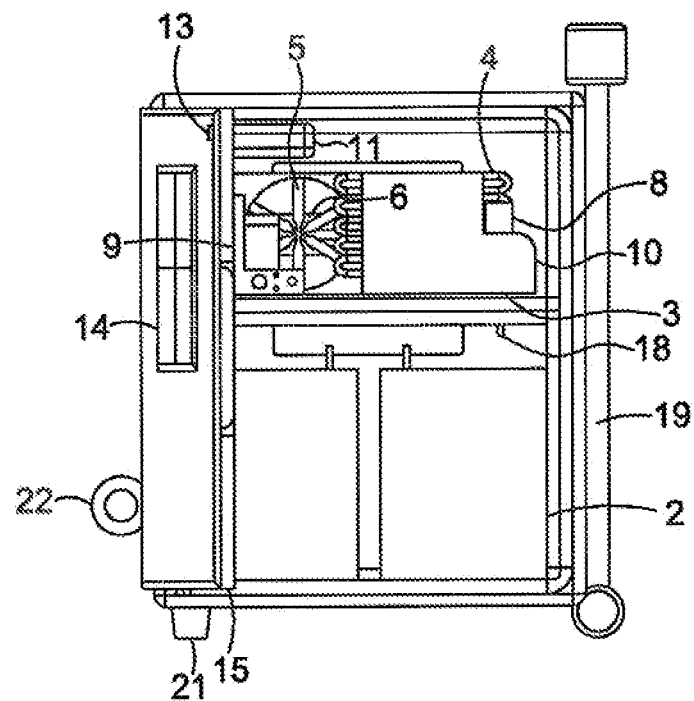
FIG. 4C depicts a front view of a base unit of an intelligent laboratory lockbox system having one or more doors in an open position, in accordance with some implementations of the present disclosure.

Continuing on with the base unit 53, FIG. 4A depicts a left side perspective of the base unit 53 having the base access door 15 in an open position. FIG. 4A illustrates the tether ring 22 on the left side of the base unit 53 along with one or more pegs 21 while FIG. 4B depicts a right side perspective of the base unit 53 having the base access door 15 in an open position.

Returning to FIGS. 1A-1C, the base unit 53 is integral in the self-regulation of the temperature of the vault unit 23. A connection exists between the base unit 53 and the vault unit 23 via a cool return hose 50 and a cool supply hose 49 for circulating a cooling fluid (e.g., gas, air, liquid, etc.). Turning our attention now to the vault unit 23 component of the ILLS 100, the vault unit 23 can comprise a vault access door 24 to access a vault interior 24 a. The vault access door 24 can be a gasketed, sealed, insulated access door affixed to the vault unit via one or more hinges such as hinge 17 and can be locked/secured to regulate entry to the vault interior 24 a. Such securing mechanisms can comprise physical structural locks, electronic locks, and the like. Exemplary securing mechanisms are depicted in the figures by providing a Bluetooth lock latch 41 and a Bluetooth lock receiver 34. The exterior of the vault unit further comprises a handle 37 and a door hanger 40.

Continuing on, the right side of the vault unit 23 comprises an electronics access door 47 comprising a cam lock 13 to secure the door 47 and is affixed to the vault unit 23 via one or more hinges, such as hinge 46. The electronics access door 47, as shown in FIG. 6C (a right side view of the vault unit 23 having the vault access door 24 in an open position), houses one or more computing devices 42, a rechargeable battery 35, one or more RFID sensors 51, and a WiFi 4G radio 27. The functions of the components discussed herein with be further discussed hereinafter.

The vault interior 24 a can comprise one or more compartments. The one or more compartments can comprise one or more specimen tube transfer racks, such as specimen tube transfer rack 31 located on shelf 26. The one or more specimen tube transfer racks can comprise one or more specimen tubes, such as specimen tube 32, shown inside specimen tube transfer rack 29. The specimen tube transfer rack 31 can, for instance, be located in a first compartment while the specimen tube 32 and specimen tube transfer rack 29 can be located in a second compartment separate from the first compartment, as shown in FIG. 1A. While the present description is being described with respect to specimen tubes and specimen tube transfer racks, any laboratory specimen in any transfer material can be utilized in the present invention.

The compartments can be divided in any way known in the art. In embodiments, each of the compartments is a drawer. The interior of the vault unit can be a single compartment with, for instance, any means for storing samples (e.g., shelves). Alternatively, the interior of the vault unit can be divided into two or more compartments. A compartment, as used herein, refers generally to any area that is separated from another area. The compartments can be separated completely or less than completely. For example, compartments can be completely separated such that individual compartments, in their entirety, are enclosed (e.g., drawers). Alternatively, compartments can be less than completely separately (i.e., partially separated) such that individual compartments are only partially enclosed and, thus, include at least a portion of an opening to another compartment (e.g., dividers between compartments that do not cover the entire height of area between compartments).

The ILLS 100 can self-regulate a plurality of compartments within the vault unit 23 of the lockbox system, wherein each of the plurality of compartments can be maintained at the same or different temperatures. For instance, the first compartment housing the specimen tube transfer rack 31 can be maintained at a first temperature while a second compartment, separate from the first compartment, housing the specimen tube 32 can be maintained at a second temperature that is different from the first temperature of the first compartment. In embodiments, each of the plurality of compartments within the vault unit 23 of the ILLS 100 is a drawer. In further embodiments, each of the plurality of compartments within the vault unit 23 is an area, as shown in FIG. 1A having a top shelf 26 first compartment and a bottom compartment (housing specimen tube transfer rack 29).

Each compartment within the ILLS 100 can be individually programmed. Thus, the settings within the ILLS 100 can be applied on a per-vault unit level, a per-compartment level, and the like. Further, when the vault unit 23 is separated from the base unit 53 of the ILLS 100, the vault unit 23 does not self-regulate the internal temperature of each of its compartments but, rather, will remain capable of passive internal temperature control, monitoring, and communication thereof. This is possible due to the presence of temperature phase change material 33 (e.g., a cooling pack).

The vault unit 23 can also comprise one or more sensors for the collection of various data and communication thereof to one or more disparate sources. The vault unit 23 can comprise, for instance, one or more temperature probes/sensors 39. The one or more temperature probes 39 can monitor a temperature within the vault unit 23. More specifically, the temperature probes 39 can monitor a temperature of each of the plurality of compartments within the vault unit 23. In embodiments, a different temperature probe 39 is associated with each of the plurality of compartments.

The vault unit 23 can further comprise one or more proximity sensors 38. The one or more proximity sensors 38 can, for instance, identify when an item (e.g., a specimen) is present in the vault unit 23. The detection can occur when an item comes within a predetermined distance from the one or more proximity sensors 38. The detection can also occur when an item enters a predetermined area that is monitored by the one or more proximity sensors 38. By way of example, and not limitation, FIG. 11A illustrates a proximity sensor 38 in each quadrant of the vault unit 23. A single proximity sensor could monitor an entire vault unit 23, an entire compartment, or the like. Conversely, a vault unit 23 can be equipped with multiple proximity sensors per compartment. Configurations can vary. The one or more proximity sensors 38 can identify when an item is present and, thus, can determine a loaded/unloaded status of the vault unit 23 and/or individual compartments within the vault unit 23.

One data is acquired by the ILLS 100, the ILLS 100 can communicate the various data to one or more disparate sources. The ILLS 100 can comprise one or more processors to communicate with one or more sources, such as the one or more computing devices 42 within the electronics access door 47. The ILLS 100 can provide information regarding specimen tracking to an individual's EHR, an EHR server, and the like; thus, enabling specimen tracking to be incorporated into clinical workflows. Further, the information communicated from the ILLS 100 can be utilized to optimize routes for couriers for specimen pickups. For instance, a loaded/unloaded status may be communicated from the ILLS 100 such that couriers are only routed to stops having specimens to pick up as indicated by a loaded status (i.e., stops where no specimens are to be picked up/no items are to be delivered are eliminated from the route). Thus, it is contemplated that the ILLS 100, either directly or indirectly (e.g., through a separate server/controller), communicates with a courier's workflow (e.g., one or more devices controlling the courier's data).

The ILLS 100 can communicate information to a patient's EHR. For instance, a patient associated with a specific sample may be identified (e.g., from a specimen label such as a barcode) and data related to that specific sample (e.g., a vault unit location, a temperature of a vault unit compartment, a scheduled pickup time, an actual pickup time, a courier route, an intended destination, a time of arrival at the intended destination, etc.) can be communicated to and integrated in the patient's EHR.

The intelligent laboratory lockbox system can be manufactured such that it is hardened for the International Protection Rating (e.g., IPXX) classifying degrees of protection provided against access to hazardous parts (e.g., electrical parts) and the intrusion of solid objects and protection of the equipment inside the enclosure against harmful ingress of water. In embodiments, the exterior of the intelligent laboratory lockbox is thermoformed plastic. Additional materials could also be used that facilitate the functions of the intelligent lockbox system, as described herein.

Figure 2A:
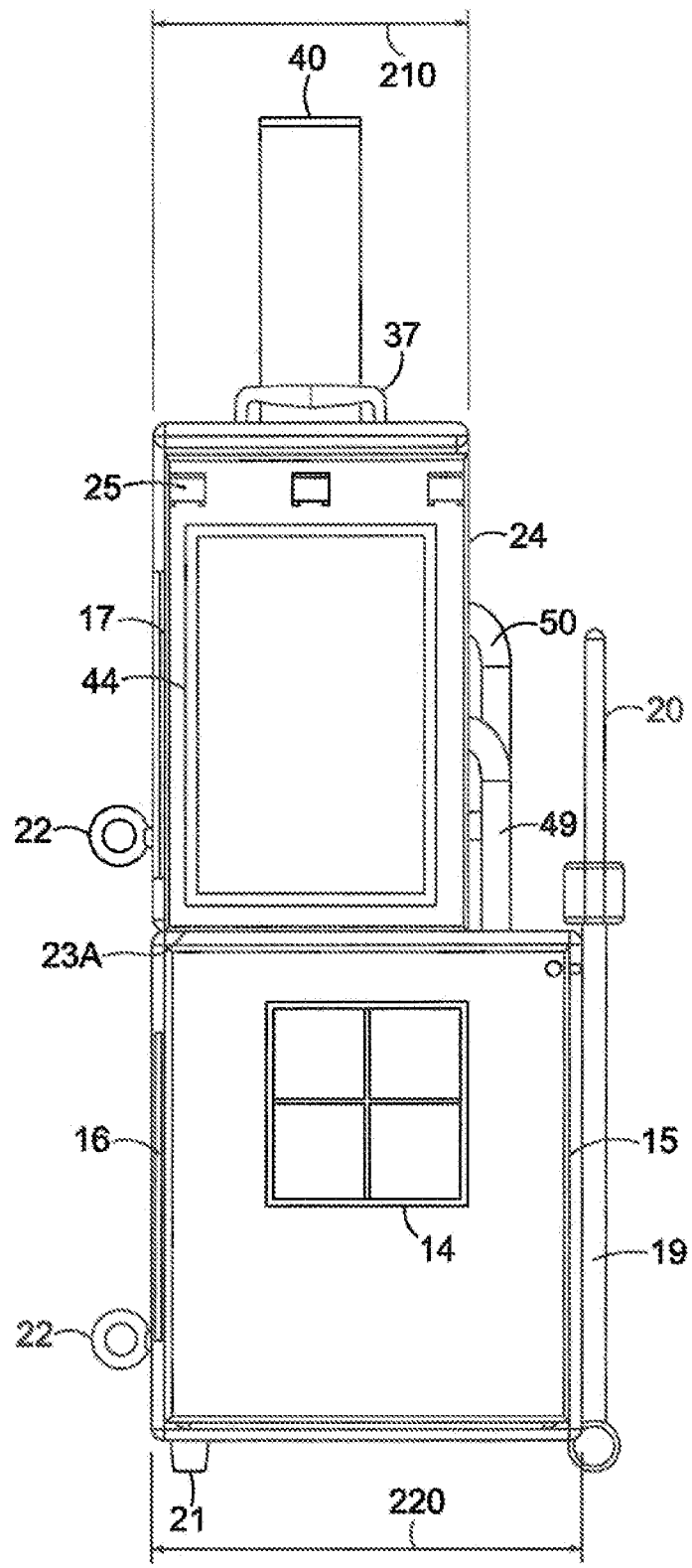
FIG. 2A depicts a front view of an intelligent laboratory lockbox system having one or more doors in a closed position, in accordance with some implementations of the present disclosure.

Turning now to FIG. 2A, a front view of the ILLS 100 having one or more doors in a closed position is provided. In particular, FIG. 2A provides the base unit 53 having the base access door 15 in a closed position and the vault unit 23 having the vault access door 24 in a closed position. As is shown in FIG. 2A, the vault unit 23 sits on a vault base 23a to connect to the base unit 53. The vault unit 23 is further connected to the base unit 53 via the cool return hose 50 and the cool supply hose 49, which circulate a cooling fluid for the self-regulation of the temperature of the ILLS 100. The base width 220 and the vault width 210 are illustrated in this view. Exemplary measurements of the vault unit 23 are 12.6" wide, 20" high, and 13.5" deep, while exemplary measurements of the base unit 53 are 17.125" wide, 21.125" high, and 14.6" deep. These measurements are merely examples and the sizes thereof are configurable.

Figure 2B:
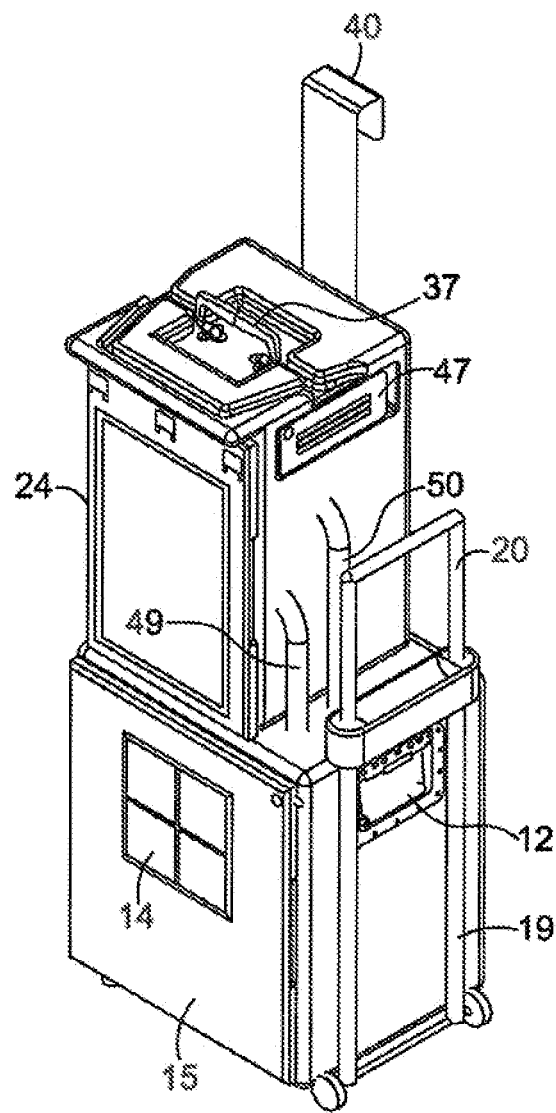
FIG. 2B depicts a right side perspective view of an intelligent laboratory lockbox system having one or more doors in a closed position, in accordance with some implementations of the present disclosure.

As is further shown in FIG. 2A and was not previously visible, the vault unit 23 further comprises a tether ring 22 on the left side of the vault unit 23. Furthermore, the vault access door 24 comprises one or more solar panels 44 and one or more display areas 25. The one or more solar panels 44 can be used to recharge the rechargeable battery 35 of the vault unit 23. The one or more display areas 25 can provide ILLS 100 data such as an internal temperature of the vault unit 23, individual compartments within the vault 23, the base unit 53, or a combination thereof. The one or more display areas 25 can also provide an indication of a loaded/unloaded status and/or a locked/unlocked status. An additional view of the ILLS 100 is provided in FIG. 2B, which depicts a right side perspective view of the ILLS 100 having the one or more doors in a closed position.

Figure 5A:
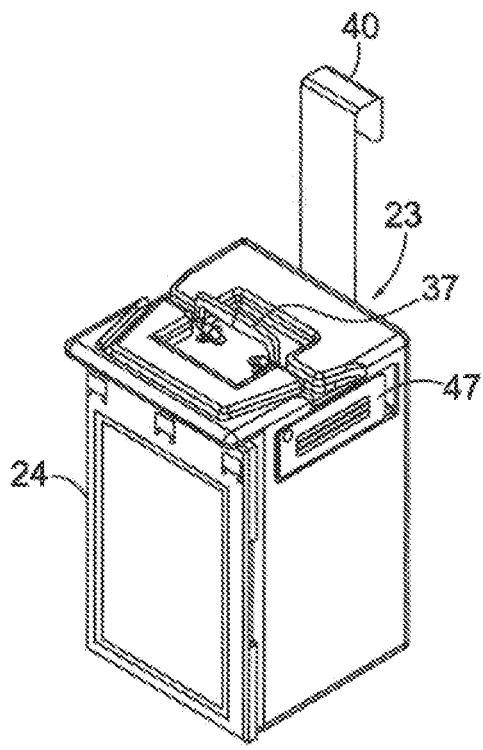
FIG. 5A depicts a right side perspective view of a vault unit of an intelligent laboratory lockbox system having one or more doors in a closed position, in accordance with some implementations of the present disclosure.
Figure 5B:
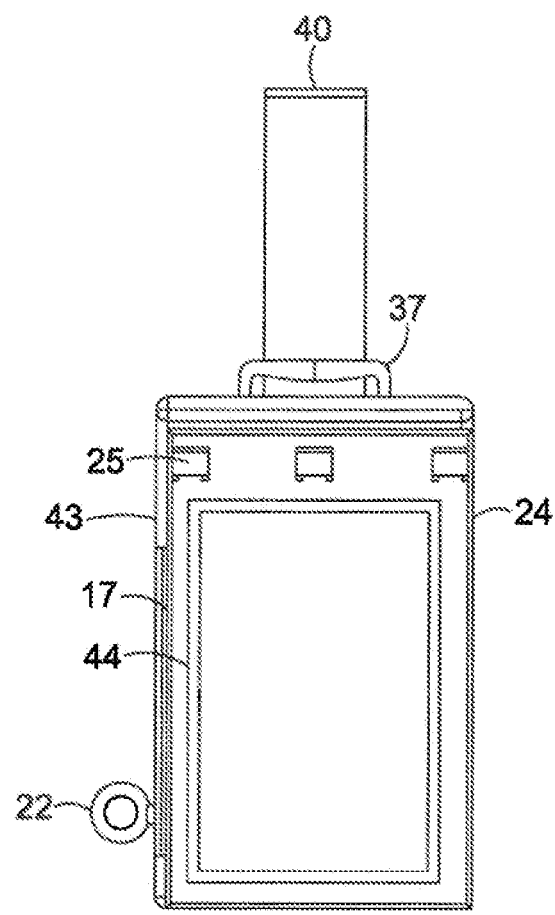
FIG. 5B depicts a front view of a vault unit of an intelligent laboratory lockbox system having one or more doors in a closed position, in accordance with some implementations of the present disclosure.
Figure 5C:
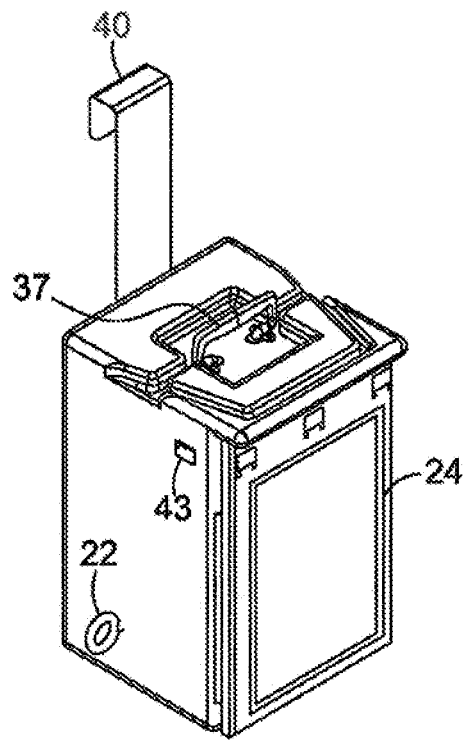
FIG. 5C depicts a left side perspective view of a vault unit of an intelligent laboratory lockbox system having one or more doors in a closed position, in accordance with some implementations of the present disclosure.

Turning now to FIGS. 5A-5C, the vault unit 23 having the vault access door 24 in a closed position is provided. Initially, FIG. 5A depicts a right side perspective view of the vault unit 23 such that the electronics access door 47 is visible. Also visible in this view is the contoured exterior top designed to shed rain around the handle 37.

FIG. 5B depicts a front view of the vault unit 23 having the vault access door 24 in a closed position. Visible in this view is the tether ring 22, the one or more display areas 25, and the one or more solar panels 44 of the vault access door 24. Also visible in this view is an external utility door 43, which houses a USB connection port for the connection of peripheral devices such as bar code scanners and to access internally stored data. Also included within the housing of the external utility door 43 is a 5.5 mm power connection.

FIG. 5C depicts a left side perspective view of the vault unit 23 having the vault access door 24 in a closed position and having the external utility door 43 in a closed position.

Figure 6A:
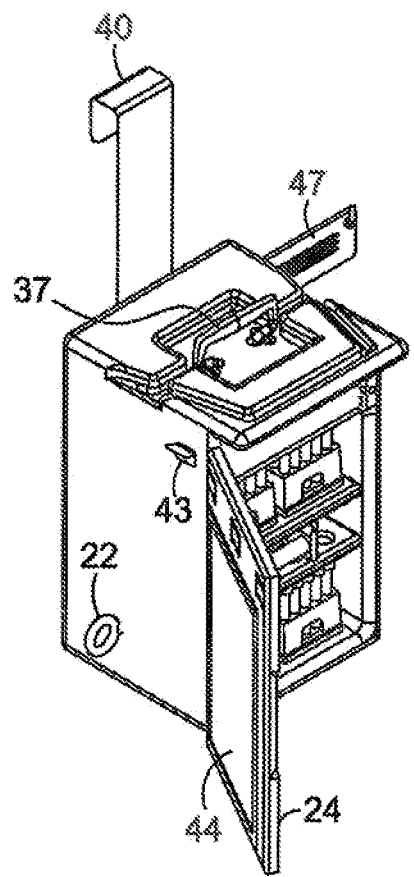
FIG. 6A depicts a left side perspective view of a vault unit of an intelligent laboratory lockbox system having one or more doors in an open position, in accordance with some implementations of the present disclosure.
Figure 6B:
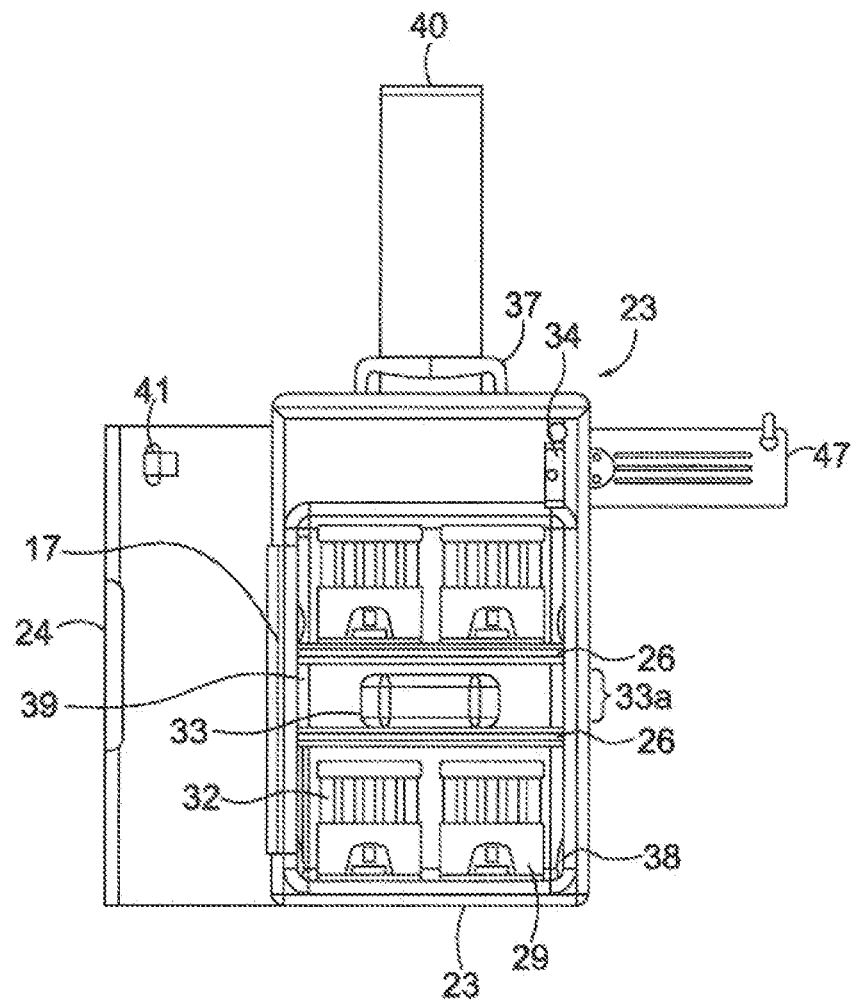
FIG. 6B depicts a front view of a vault unit of an intelligent laboratory lockbox system having one or more doors in an open position, in accordance with some implementations of the present disclosure.
Figure 6C:
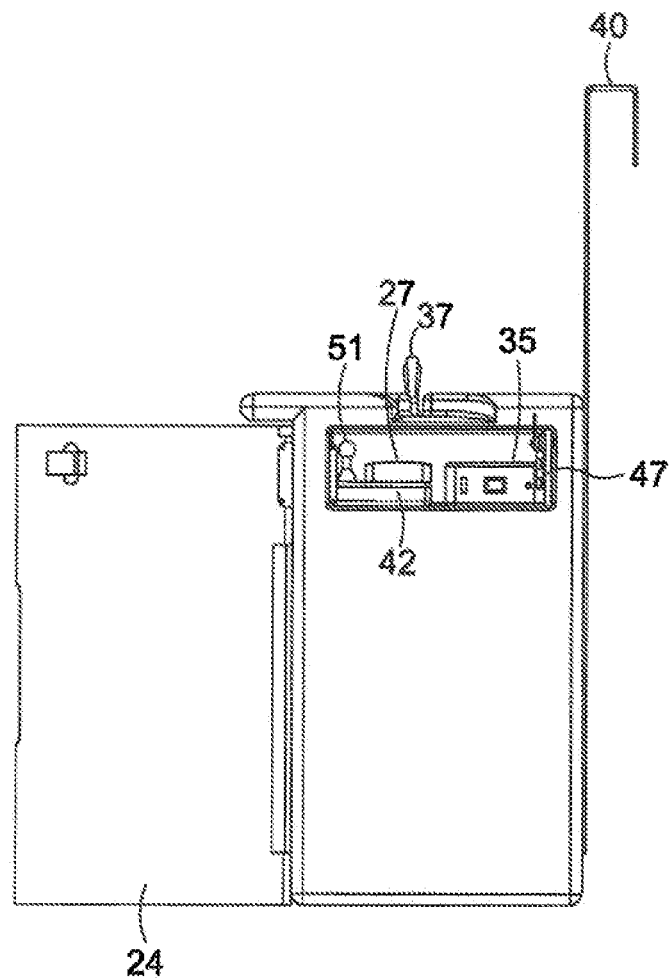
FIG. 6C depicts a right side view of a vault unit of an intelligent laboratory lockbox system having one or more doors in an open position, in accordance with some implementations of the present disclosure.

Turning now to FIGS. 6A-6C, the vault unit 23 is depicting having the vault access door 24 in an open position. FIG. 6A depicts each of the vault access door 24, the external utility door 43, and the electrics access door 47 in an open position. FIG. 6B depicts a front view of the vault unit 23 having each of the vault access door 24 and the electrics access door 47 in an open position. Also visible in FIG. 6B are the tube transfer rack 29 containing one or more specimen tubes, such as specimen tube 32. Between the compartment housing the tube transfer rack 29 and the compartment above shelf 26 is another compartment 33a housing temperature phase change material 33. The temperature phase change material helps to maintain a temperature if/when the vault unit 23 is removed from the base unit 53.

FIG. 6C depicts a right side view of the vault unit 23 having the vault access door 24 and the electrics access door 47 in an open position. Particularly FIG. 6C depicts the interior of the area housed behind the electrics access door 47. The area behind the electrics access door 47 comprises, as previously noted, one or more computing devices 42, a rechargeable battery 35, one or more RFID sensors 51, and a WiFi 4G radio 27. The one or more computing devices 42 can receive data from each of the one or more RFID sensors 51, the one or more proximity sensors 38, the one or more temperature probe/sensors 39, and the like, and communicate the information to disparate sources. The one or more RFID sensors 51 can be used to track one or more RFID-tagged specimens within the vault unit 23. The tracking can be continuous or can be initiated, either at the vault unit 23 or a remote computer, when the vault unit 23 is detached from the base unit 53. The ILLS 100 can include several security features that track the ILLS 100 or the individual base unit 53 and/or vault unit 23 and/or trigger generation of an alarm if/when the ILLS 100 or any component thereof is moved from a designated location. The ILLS 100 can include tracking features (e.g., GPS) enabling tracking of the lockbox in the event it is moved/stolen.

The WiFi 4G-enabled radio 27 is used to facilitate communication of the information noted herein, in an embodiment. The ILLS 100 can include any means of communication features such as cellular, satellite, WiFi, GPS, Bluetooth, and the like. Security features for access can also be included, as have been mentioned herein. Exemplary security features such as a PIN, RFID swipe, or a Bluetooth-enabled compatible application can be utilized to secure the ILLS 100. The ILLS 100, specifically the vault unit 23 and/or the base unit 53, can include a keypad for entry of a PIN, a biometric screening tool for entry utilizing biometric information, and the like.

Further, the vault unit 23 comprises a rechargeable battery 35. In embodiments, the rechargeable battery is a Lithium Ion battery. The rechargeable battery can be recharged via a 120/12V power source. The rechargeable battery can be recharged via solar power using, for example, the one or more solar panels.

As the overall ILLS 100 and components thereof have been discussed above, provided below is a description the functionality. As mentioned, the ILLS 100 provides a secured vault unit 23 to house one or more specimens at a location or during transport. The one or more specimens often require certain temperatures/conditions for storage. The vault unit 23, therefore, is connected to a base unit 53 that, using the components thereof, self-regulates the internal temperature of the vault unit 23 regardless of the external temperature. The components of the base unit 53 have been noted above and one having skill in the art would recognize the components needed for temperature regulation. The necessary components for temperature regulation, however, are large in size and fairly heavy. Thus, a specimen storage system is provided that offers a temperature-controlled environment for samples awaiting pickup to be transported to a destination. Put simply, an originating source can obtain the specimen sample and the specimen sample can be put into the ILLS 100 (i.e. a laboratory sample drop box) to be picked up by a courier, for instance, and routed to a destination.

As previously noted, the vault unit 23 (and/or the base unit 53) can include one or more sensors such as the temperature sensors 39 and the one or more proximity sensors 38 previously mentioned. The vault unit 23 can include one or more sensors to identify temperature, weight, specimen presence, door openings, and the like. For example, weight sensors could be integrated into shelves of the vault unit 23. The information identified by the one or more sensors can be communicated to one or more remote computing devices/servers by, for instance, the one or more computing devices 42.

Specimen presence sensors can, for example, identify or detect when an item (e.g., specimen) is present in the intelligent laboratory lockbox system or, more particularly, within the vault unit. The intelligent laboratory lockbox system can include a single sensor to identify any item is present or can include more than one sensor associated with, for example, different compartments within the intelligent laboratory lockbox system to specifically identify or detect which compartment within the intelligent laboratory lockbox system includes an item. In one embodiment, a presence sensor may include, but is not limited to, a weight sensor, an image sensor, a motion sensor, a proximity sensor, and/or other type of sensor. The one or more sensors can communicate with one or more processors of a control unit 11 of the ILLS 100, such as the one or more computing devices 42 of the vault unit 23, to identify that an item is present within the vault unit 23. That information can be communicated to one or more remote sources such as a laboratory, a third party (e.g., a courier or courier system), an EHR, an EHR server, and the like.

Alternatively, a load status (e.g., loaded, unloaded) can be indicated by a press of a button (on the exterior of the vault unit 23 and/or the base unit 53). The button can be programmed to communicate with a laboratory, or any other remote destination, that an item is present and pickup is ready. The loaded/unloaded status can be reset utilizing the same button. For instance, if a user (e.g., laboratory staff) manually loads or unloads the vault unit 23, the user can press the button until the desired updated status is achieved. The status indicators (e.g., loaded, unloaded, etc.) as well as other information including, but not limited to, a locked/unlocked status, a temperature (potentially for each compartment), and the like, can be displayed via the one or more display areas 25. The intelligent laboratory lockbox system can also include one or more external-facing LED temperature displays for displaying one or more temperatures of one or more compartments within the intelligent laboratory lockbox system.

In a further example, the loaded/unloaded status can be reset utilizing a Bluetooth-enabled compatible application. For example, authorized users can access a compatible application that communicates with and/or controls the ILLS 100. The compatible application can also be used to provision an ILLS by assigning it to a location or a client (or both) with a unique identifier. The compatible application may be utilized on a mobile device.

If the ILLS 100 loses communication, a notification can be generated that the intelligent laboratory lockbox is offline and not communicating with other devices. The notification can be communicated to any designated destinations in the event of an offline status. The notification can be in the form of a text message, an email, a phone call, and the like to one or more designated authorized users.

Embodiments herein include a system having a central repository of all telemetry data of the intelligent laboratory lockbox. In embodiments, the central repository is in communication with an EHR server. The telemetry data can be used to perform route optimization to couriers to route the couriers to locations known to have items within the ILLS 100 associated with the location. The ILLS 100 status data can be available to any user having access to the central repository.

Thus, the ILLS 100 is in communication with a central repository, which communicates with an EHR server. In embodiments, the ILLS 100 communicates directly with the EHR server. In other embodiments, the ILLS 100 communicates with one or more processors/computing devices separate from the ILLS 100 and the remote processors then further disseminate the information. For instance, in the case of courier system integration, the ILLS 100 communicates with a remote processor that is integrated into the courier system. Thus, updates can be immediately made to a specimen pickup workflow, when needed.

For example, assume that a specimen pickup workflow is created prior to a day's pickup route. A schedule could, for instance, be utilized for an initial generation of a specimen pickup (e.g., a specimen is scheduled to be obtained in the morning and should be picked up by the afternoon). If the loaded status is unloaded at a predetermined time prior to the scheduled pickup, the stop may be removed from the specimen pickup workflow (i.e., schedule). Conversely, if a vault unit were not scheduled for a pickup but the vault unit is designated in a loaded status, a specimen pickup workflow can be modified to include the vault unit that was not previously included in the specimen pickup workflow. Status checks of the vault units can be performed continuously or at predetermined times. For instance, when a vault unit is incorporated into a specimen pickup workflow, a confirmation of a loaded status can be performed at a predetermined time to confirm that the vault unit is still loaded and should remain in the specimen pickup workflow. When a vault unit is not included in a specimen pickup workflow, status checks can be performed at predefined intervals so that if the status changes to loaded the vault unit can be added to a specimen pickup workflow.

The intelligent laboratory lockbox system described herein provides many advantages including, but not limited to, physical protection of personal health information (PHI) contained within specimen packages, improved specimen integrity through the maintenance of appropriate storage temperatures, identification of sites with specimens to improve route efficiency via intraday route optimization, avoidance of missed pickups and improved specimen tracking accountability (e.g., courier has already picked up and staff places specimens in lockbox after courier departure), providing an alternate method of communicating the need for a specimen pickup, etc.

Figure 7:
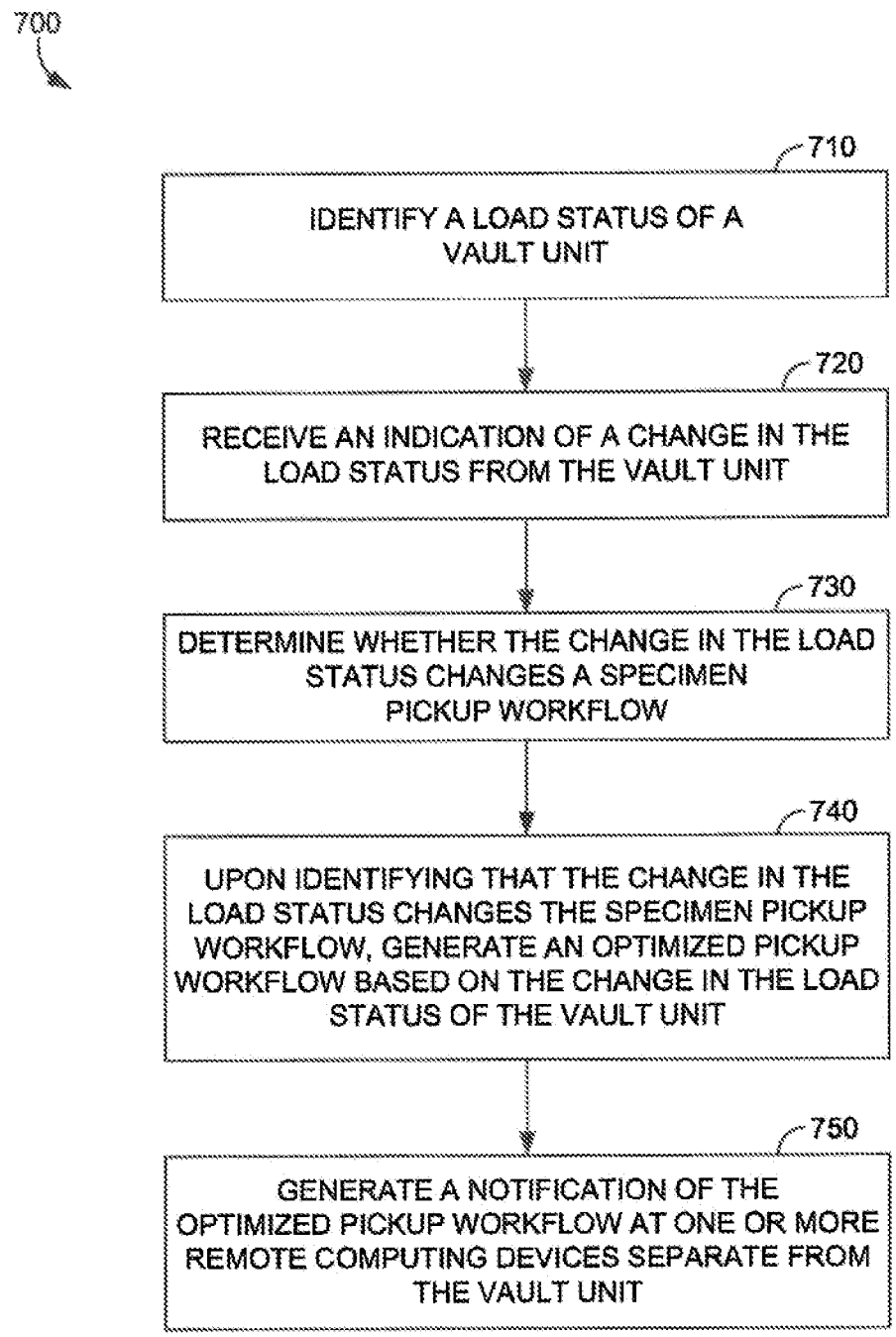
FIG. 7 is a flow diagram of an exemplary method, in accordance with some implementations of the present disclosure.

Turning now to FIG. 7, an exemplary method 700 is provided, which may be implemented and performed by the control unit 11 and/or a control unit from a remote computing device with network access to a vault unit. At block 710, a loaded status of a vault unit is identified. As noted above, the loaded status can be detected by a computing device by a manual indication (e.g., a button) or by one or more presence sensors of the vault unit, such as one or more proximity sensors that sense the presence of items within the vault unit. At block 720, an indication of a change in the loaded status is received from the vault unit. At block 730, it is determined whether the change in the loaded status changes a specimen pickup workflow. For instance, if a vault unit was previously in an unloaded state but becomes loaded, it would need to be added to a pickup workflow. Conversely, if the vault unit was previously in a loaded state but became unloaded, it would need to be removed from a pickup workflow. At block 740, upon determining that the change in the loaded status changed the specimen pickup workflow, an optimized pickup workflow is generated (or the specimen pickup workflow is modified) based on the change in the loaded status of the vault unit. The optimized/modified pickup workflow will include a change or modification based on the change in the loaded status. At block 750, a notification of the optimized/modified pickup workflow is generated at one or more remote computing devices separate from the vault unit. The notification can be generated, for instance, at a mobile computing device of a courier. The notification can be generated, by way of further example, at a computing device of a source associated with the vault unit.

Figure 8:
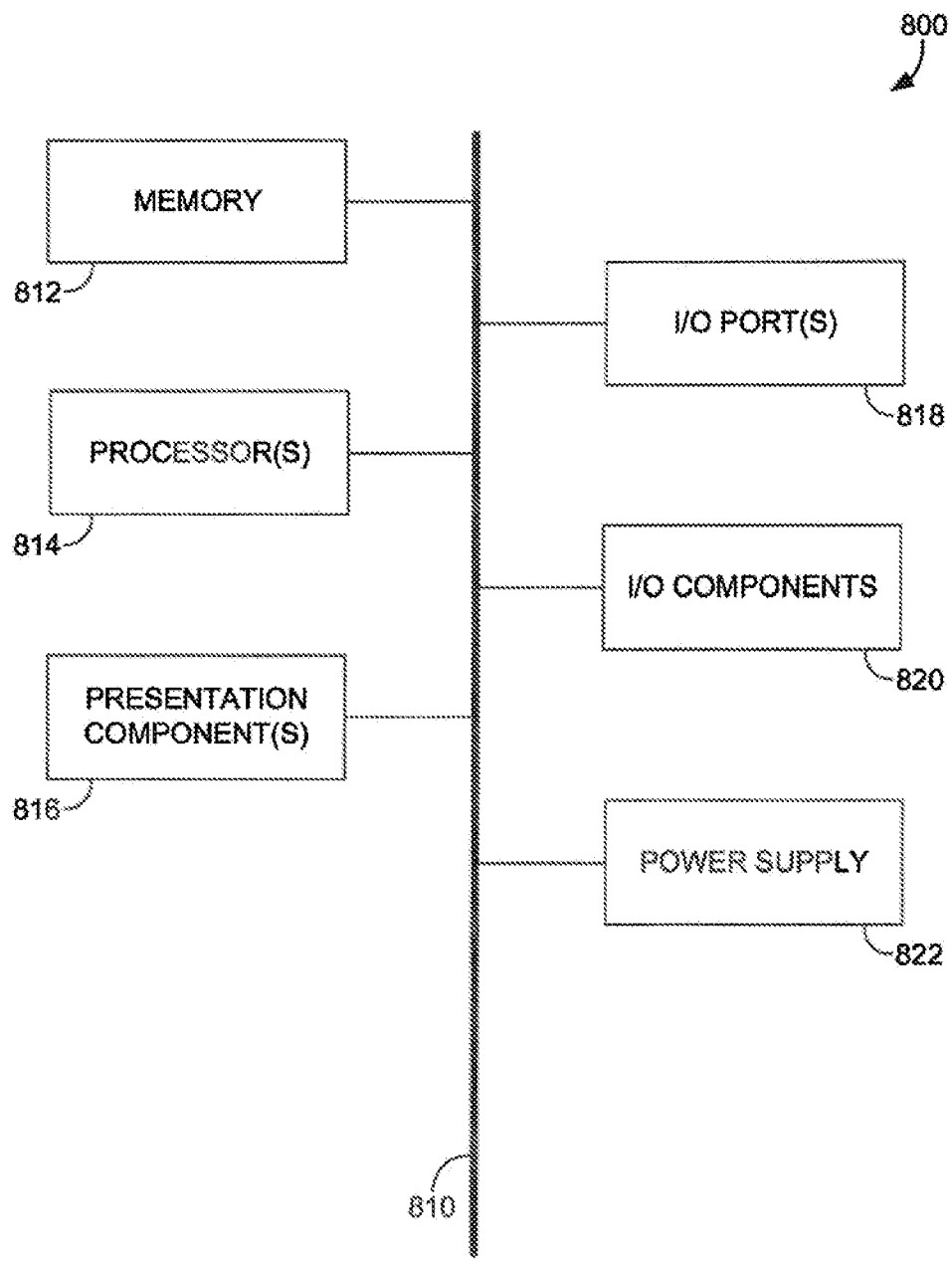
FIG. 8 depicts an example computing device, in accordance with some implementations of the present disclosure.

Having described implementations of the present disclosure, an exemplary operating environment in which embodiments of the present invention may be implemented is described below in order to provide a general context for various aspects of the present disclosure. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A laboratory lockbox system comprising:
   a base unit;
   a vault unit including one or more compartments to store one or more specimens;
   a fluid connection between the base unit and the vault unit;
   at least one temperature sensor configured to measure an internal temperature of the vault unit;
   a cooling mechanism configured within the base unit and configured to, based on at least the internal temperature received from the at least one temperature sensor, activate cooling functions to self-regulate the internal temperature to a first temperature;
   one or more presence sensors configured to detect a presence of a specimen within the one or more compartments of the vault unit and generate a load status based on sensing a specimen, wherein the load status includes one of a loaded status or an unloaded status;
   a control unit operably connected to at least the vault unit and the one or more presence sensors, wherein the control unit is configured to:
   receive an indication of a change in the load status from the vault unit;
   determine whether the change in the load status changes a specimen pickup workflow;
   upon determining that the change in the load status changes the specimen pickup workflow, generate an optimized pickup workflow based on the change in the load status of the vault unit;
   wherein in response to the load status changing from the unloaded state to the loaded state, the optimized pickup workflow is generated to include a courier route to a location of the vault unit to pickup the specimen;
   wherein in response to the load status changing from the loaded state to the unloaded state, the optimized pickup workflow is generated to remove the courier route to the location of the vault unit;
   generate a notification of the optimized pickup workflow at one or more remote computing devices separate from the vault unit; and
   transmit the notification of the optimized pickup workflow to a destination device.

2. The laboratory lockbox system of claim 1, wherein the control unit is further configured to:
   receive the internal temperature of the vault unit as measured by the at least one temperature sensor; and
   communicate the internal temperature to an electronic health record (EHR) for storage.

3. The laboratory lockbox system of claim 1, wherein the control unit is further configured to generate and transmit a signal to a remote computing device to remove the vault unit from the optimized pickup workflow in response to the loaded status being unloaded.

4. The laboratory lockbox system of claim 1,
   wherein the control unit is further configured to monitor the specimen pickup workflow; and
   modify the specimen pickup workflow to include the vault unit into the specimen pickup workflow in response to:
   determining that (i) the vault unit is not scheduled for a pickup based on the specimen pickup workflow and that (ii) the vault unit is designated in a loaded status.

5. The laboratory lockbox system of claim 1, wherein the specimen pickup workflow comprises a schedule of one or more specimen pickups from one or more vault units.

6. The laboratory lockbox system of claim 1, wherein the control unit is configured to monitor the load status at predetermined intervals of time.

7. A laboratory lockbox system comprising:
   a vault unit including one or more compartments to store one or more specimens;
   at least one temperature sensor configured to measure an internal temperature of at least one compartment of the one or more compartments in the vault unit;
   a cooling mechanism configured to, based on at least the internal temperature received from the at least one temperature sensor, activate cooling functions to self-regulate the internal temperature to a designated temperature;
   one or more presence sensors configured to detect a presence of a specimen within the one or more compartments of the vault unit and configured to generate a load status based on sensing a specimen, wherein the load status includes one of a loaded status or an unloaded status;
   a control unit operably connected to at least the vault unit and the one or more presence sensors, wherein the control unit is configured to:
   receive an indication of a change in the load status from the vault unit or the one or more presence sensors wherein the load status is detected by the one or more presence sensors;
   access, via a network communication to a remote computing device, a specimen pickup workflow and determine whether the change in the load status is different than a status associated with the vault unit in the specimen pickup workflow, wherein the specimen pickup workflow is maintained by the remote computing device;
   upon determining that the change in the load status changes the status in the specimen pickup workflow, generate an optimized pickup workflow based on the change in the load status of the vault unit;

wherein in response to the load status changing from the unloaded state to the loaded state, the optimized pickup workflow is generated to include a courier route to a location of the vault unit to pickup the specimen; and wherein in response to the load status changing from the loaded state to the unloaded state, the optimized pickup workflow is generated to remove the courier route to the location of the vault unit;

generate a notification of the optimized pickup workflow at one or more remote computing devices separate from the vault unit; and transmit the notification of the optimized pickup workflow to a destination device.

8. The laboratory lockbox system of claim 7, wherein the control unit is further configured to:

receive an internal temperature of the vault unit as measured by the at least one temperature sensor operably connected to the one or more compartments in the vault unit; and communicate the internal temperature to an electronic health record (EHR) for storage.

9. The laboratory lockbox system of claim 7, wherein the control unit is further configured to:

generate and transmit a signal to a remote computing device to remove the vault unit from the optimized pickup workflow in response to the load status being the unloaded status.

10. The laboratory lockbox system of claim 7, wherein the control unit is further configured to:

monitor the specimen pickup workflow; and modify the specimen pickup workflow to include the vault unit into the specimen pickup workflow in response to:

determining that (i) the vault unit is not scheduled for a pickup based on the specimen pickup workflow and that (ii) the vault unit is designated in the loaded status based on the one or more presence sensors.

11. The laboratory lockbox system of claim 7, wherein the one or more remote computing devices comprise one or more mobile devices.

12. The laboratory lockbox system of claim 7, wherein the control unit is further configured to: monitor the load status at predetermined intervals of time from the one or more presence sensors.

13. A laboratory lockbox system comprising:

a vault unit including one or more compartments to store one or more specimens;

at least one temperature sensor configured to measure an internal temperature of at least one compartment of the one or more compartments in the vault unit;

a cooling mechanism configured to, based on at least the internal temperature received from the at least one temperature sensor, activate cooling functions to self-regulate the internal temperature to a designated temperature;

one or more presence sensors configured to detect a presence of a specimen within the one or more compartments of the vault unit and generate a load status based on sensing a specimen, wherein the load status includes one of a loaded status or an unloaded status;

a control unit operably connected to at least the vault unit and the one or more presence sensors, wherein the control unit is configured to:

receive an indication of a change in the load status from the vault unit;

access a specimen pickup workflow and determine whether the change in the load status is different than a status in the specimen pickup workflow, wherein the specimen pickup workflow is maintained by a remote computing device;

upon determining that the change in the load status changes the specimen pickup workflow, modify the specimen pickup workflow based on the change in the load status of the vault unit;

wherein in response to the load status changing from the unloaded state to the loaded state, modify the specimen pickup workflow to include a courier route to a location of the vault unit to pickup the specimen from the vault unit; and wherein in response to the load status changing from the loaded state to the unloaded state, modify the specimen pickup workflow to remove the courier route to the location of the vault unit.

14. The laboratory lockbox system of claim 13, wherein the control unit is configured to:

generate a notification of the modified specimen pickup workflow at one or more remote computing devices separate from the vault unit; and transmit the notification of the modified specimen pickup workflow to a destination device.

15. The laboratory lockbox system of claim 14, wherein the control unit is further configured to:

receive the internal temperature of the vault unit as measured by the at least one temperature sensor; and communicate the internal temperature to an electronic health record (EHR) for storage.

16. The laboratory lockbox system of claim 13, wherein the control unit is further configured to:

generate and transmit a signal to a remote computing device to remove the vault unit from the modified specimen pickup workflow in response to the load status indicating the unloaded status.

17. The laboratory lockbox system of claim 13, wherein the control unit is further configured to:

modify the specimen pickup workflow to include the vault unit into the specimen pickup workflow in response to:

determining that (i) the vault unit is not scheduled for a pickup based on the specimen pickup workflow and that (ii) the vault unit is designated having the loaded status based on the one or more presence sensors.

18. The laboratory lockbox system of claim 13, wherein the control unit is further configured to monitor the load status at predetermined intervals of time from the one or more presence sensors.

* * * * *